July 6, 1937.  D. M. JONES ET AL  2,086,421
ELECTRIC TRANSMISSION SYSTEM
Filed Sept. 11, 1935
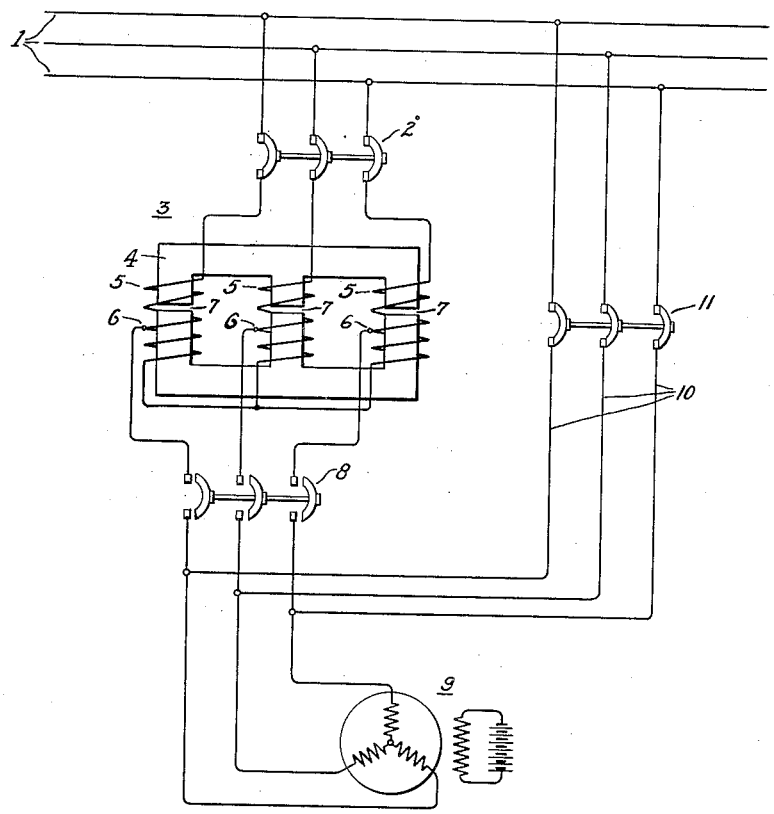
Inventors:
David M. Jones,
George S. Lunge,
by Harry E. Dunham
Their Attorney.

Patented July 6, 1937

2,086,421

UNITED STATES PATENT OFFICE 2,086,421

ELECTRIC TRANSMISSION SYSTEM

David M. Jones and George S. Lunge, Schenectady, N. Y., assignor to General Electric Company, a corporation of New York Application September 11, 1935, Serial No. 40,072

5 Claims. (Cl. 172—246)

Our invention relates to electric transmission systems and more particularly to the control and operation of synchronous condensers in electric systems of transmission.

An object of our invention is to provide a voltage regulating system for electric systems which will facilitate the use of synchronous condensers in the maintenance of system voltage conditions.

Another object of our invention is to provide an electric transmission system in which the range of the synchronous condenser station capacity may be extended beyond the nominal or normal limit of the condensers.

A further object of our invention is to provide an electric transmission system in which the amount of lagging current supplied to the system may be increased beyond the normal capacity of the synchronous condenser without increasing the size of the synchronous condensers and without operating the condensers above their rated or nominal capacities.

Another object of our invention is to provide an electric transmission system wherein the capacity and the cost of the synchronous condenser equipment will be relatively low, while at the same time sufficient lagging current may be introduced into the system when the system demands it to meet the requirements of voltage regulation.

The requirements of electric power transmission systems have indicated a need for equipment to supplement synchronous condensers in supplying lagging current and thereby assist in the maintenance of predetermined system voltage conditions. This need has become more apparent with the use of gas-cooled synchronous condensers. In the case of hydrogen-cooled condensers, because of the smaller physical size of the condensers, the maximum lagging kilovolt-amperes obtainable is frequently insufficient to meet the demands of the particular system where the condenser equipment is adapted primarily for furnishing the necessary leading, kilovolt-amperes for the system.

In accordance with our invention, we provide a system in which an inductive device of relatively low impedance may be used to start a synchronous condenser and which also may be connected to the system in parallel with the condenser to increase the amount of lagging current introduced into the system beyond the normal capacity of the condenser. This inductive device may be a reactor, a transformer, an auto-transformer or other suitable inductive apparatus.

Our invention will be better understood from the following description taken in connection with the accompanying drawing, and its scope will be pointed out in the appended claims.

A particular embodiment of our invention is shown diagrammatically in the single figure of the accompanying drawing.

Referring to the drawing, we use an inductive device or auto-transformer 3 of relatively low impedance which may be energized from a supply line 1, through switch 2, to furnish a reduced starting voltage to a synchronous condenser 9. The auto-transformer 3, illustrated for a three-phase system, is provided with a three-legged core member 4, having windings 5 on each leg in star-connection and each provided with taps 6. The taps 6 are connected to the terminals of condenser 9 through switch 8. Each leg of the core member 4 is provided with an air-gap 7. A plurality of air-gaps in each leg may be used, if desired. It will be readily understood by those skilled in the art that the air-gaps 7 may be filled with a non-magnetic material or the core member 4 may be provided with a non-magnetic portion. The presence of the air-gaps 7 increases the reluctance of the magnetic circuit and tends to give to the transformer a relatively low impedance. We have found that when the magnetizing impedances of the windings 5 are comparable in magnitude or substantially equal to the synchronous impedance of the condenser 9, the synchronous condenser 9 may be started from the circuit 1 through the device 3, and may be operated in parallel therewith to increase appreciably the amount of lagging kilovolt-amperes introduced into the circuit beyond the normal lagging capacity of the condenser 9. This low-impedance characteristic of the transformer causes it to introduce into the system a relatively large amount of lagging current. A circuit 10 is also provided to connect the condenser 9 directly to the circuit 1 through switch 11.

To start the synchronous condenser 9, a reduced potential is applied to the condenser from the taps 6 on the windings 5 of the auto-transformer 3. During the starting operation, switches 2 and 8 are closed to energize the auto-transformer and to connect the synchronous condenser to the low voltage taps, while the switch 11 is maintained in the open position. After the condenser has attained the desired speed, switch 8 may be opened and switch 11 may be closed to connect the condenser directly to the supply line. The auto-transformer 3 may be disconnected by opening switch 2, if the amount of lagging current demanded by the system does not exceed the normal lagging capacity of the condenser. And, if the amount of lagging kilovolt-amperes demanded by the system exceeds the normal lagging capacity of the condenser, the switch 2 may be maintained in the closed position. The drawing illustrates the system when both the condenser and the auto-transformer are connected directly to the supply circuit 1, in which arrangement there may be introduced into the system an amount of lagging current in excess of the normal lagging capacity of the condenser.

Although not limited thereto, a particular application of our invention may be in the use of our system to extend the range of voltage regulation within which a synchronous condenser may be required to maintain predetermined voltage conditions.

While our invention is peculiarly adapted to utilize the advantages of an auto-transformer, it is apparent that we have disclosed a general combination of apparatus and methods of operation not limited to any particular construction of transformer or inductive device.

We have shown and particularly described certain embodiments of our invention and certain methods of operation embraced therein for the purpose of explaining its principle and showing its application, but it will be obvious to those skilled in the art that many modifications and variations are possible without departing from our invention, and we aim in the appended claims to cover all such modifications and variations as fall within the true scope of our invention.

What we claim as new and desire to secure by Letters Patent of the United States, is:

1. In an electric transmission system, the combination with a supply circuit, of a synchronous condenser, means comprising a single transformer including a core member having a high reluctance portion and a winding having a magnetizing impedance comparable in magnitude to the synchronous impedance of said condenser for starting said condenser and for increasing the amount of lagging kilovolt-amperes introduced into said supply circuit beyond the normal lagging capacity of said condenser, means for connecting said condenser to said supply circuit through said winding, and means for connecting said transformer and said condenser in parallel to said supply circuit.

2. In an electric transmission system, the combination with a supply circuit, of a synchronous condenser, an auto-transformer including a winding having a magnetizing impedance comparable in magnitude to the synchronous impedance of said condenser for starting said condenser and for increasing the amount of lagging kilovolt-amperes introduced into said supply circuit beyond the normal lagging capacity of said condenser, said auto-transformer having a core member provided with an air-gap in each leg, means for connecting said condenser to said supply circuit through said winding, and means for connecting said auto-transformer and said condenser in parallel to said supply circuit.

3. In a voltage regulating system for an electric transmission system, the combination with a supply circuit of a synchronous condenser, an inductive device including a winding having a magnetizing impedance comparable in magnitude to the synchronous impedance of said condenser for starting said condenser and for increasing the amount of lagging kilovolt-amperes introduced into said supply circuit beyond the normal lagging capacity of said condenser, said inductive device having a core member provided with an air-gap, means for connecting said condenser to said supply circuit through said winding, and means for connecting said inductive device and said condenser in parallel to said supply circuit.

4. In an electric transmission system, the combination of a supply circuit, a synchronous condenser, means energized from said supply circuit for increasing the amount of lagging kilovolt-amperes introduced into said supply circuit beyond the normal lagging capacity of said condenser comprising a single transformer including a core member having a high reluctance portion and a winding having a magnetizing impedance comparable in magnitude to the synchronous impedance of said condenser and having low voltage starting connections, means for connecting said condenser to said low voltage connections for starting said condenser, and means for energizing said condenser and said transformer in parallel.

5. In combination, a supply circuit, a synchronous condenser, an inductive device including a core member having a high reluctance portion and a winding having a magnetizing impedance comparable in magnitude to the synchronous impedance of said condenser, means for energizing said condenser from said supply circuit through said winding to start said condenser and means for connecting said winding and said condenser in parallel across said supply circuit to increase the amount of lagging kilovolt-amperes introduced into said supply circuit beyond the normal lagging capacity of said condenser.

DAVID M. JONES.
GEORGE S. LUNGE.